United States Patent

Meeker

Patent Number: 5,306,202
Date of Patent: Apr. 26, 1994

[54] DEBONING SCREEN

[75] Inventor: Rick A. Meeker, Davenport, Iowa

[73] Assignee: The Kartridg Pak Co., Davenport, Iowa

[21] Appl. No.: 932,707

[22] Filed: Aug. 9, 1992

[51] Int. Cl.⁵ .................................... B02C 23/16
[52] U.S. Cl. .............................. 452/138; 452/135; 241/24; 241/74
[58] Field of Search ............... 452/135, 138; 241/24, 241/74, 82.3, 89.2

[56] References Cited

U.S. PATENT DOCUMENTS

| Re. 31,631 | 7/1984 | McFarland | 452/138 |
| Re. 32,060 | 12/1985 | McFarland | 452/138 |
| Re. 32,531 | 10/1987 | Beck et al. | 241/24 |
| 3,741,772 | 6/1973 | McFarland | 452/138 |
| 4,303,206 | 12/1981 | Prince et al. | 452/138 |
| 4,546,927 | 10/1985 | Bloome et al. | 241/74 |
| 4,824,027 | 4/1989 | Shaw et al. | 241/74 |
| 5,160,290 | 11/1992 | Richburg | 452/135 |

Primary Examiner—Willis Little
Attorney, Agent, or Firm—Lockwood, Alex, FitzGibbon & Cummings

[57] ABSTRACT

One known type of machine in use for separating meat from feed material containing sinew-like material and bone particles includes a foraminous cylinder or sleeve-like screen in which a conveying auger rotates. Such feed material is introduced into the infeed end of the cylinder/auger combination. The auger conveys the feed material toward the discharge end of the combination. During conveyance, meat is separated by exuding through the foramina. Compacted residue formed primarily of bone particles and sinew-like material discharges through a restricted orifice provided by a valve located at the discharge end of the cylinder/auger combination. Heretofore, the foramina in the screen were arranged in circumferential rows separated from each other by circumferential bands free of foramina. According to the present invention, novel foraminous cylinders or screens are provided in which the foraminous areas do not include circumferential bands which are free of foramina. Instead, the foramina or holes are arranged in circumferential rows with the holes in each row of adjacent rows being tangent on one side to a common circumferential line. By eliminating foramina-free bands, the number or concentration of the foramina can be substantially increased. The novel foraminous cylinders improve the operation of the meat separating machines by substantially reducing the temperature rise in the exuded meat (e.g. by 15° to 20° F.) and substantially increasing the throughput (e.g. by 30 to 40%).

5 Claims, 2 Drawing Sheets

DEBONING SCREEN

BACKGROUND AND DESCRIPTION OF THE INVENTION

This invention relates generally to a new and useful improvement in meat separating machines of the type wherein a conveying screw or auger rotates within a foraminous cylinder or sleeve-like screen so as to separate meat from an infeed material which has an appreciable content of sinew-like material and bone particles. In particular, this invention relates to improvements in the foraminous screens or cylinders utilized in such meat separating machines.

Rotary screw-type deboners or meat separating machines of the type in which a foraminous cylinder or sleeve-like screen and conveying auger or screw form important components are disclosed in a number of U.S. Pat. Nos. including: RE 32,531 to Beck et al. dated Oct. 27, 1987; RE 31,631 to McFarland dated Jul. 17, 1984; 4,303,206 to Prince et al. dated Dec. 1, 1981; 4,546,927 to Bloome and Shaw dated Oct. 15, 1985 and 4,824,027 to Shaw and Brooker dated Apr. 25, 1989. The disclosures of Beck et al. RE 32,531, Bloome and Shaw 4,546,927 and Shaw and Brooker 4,824,027, all assigned to The Kartridg Pak Co. of Davenport, Iowa, are incorporated by reference herein. In meat separating machines of the foregoing type an infeed containing appreciable contents of sinew-like material and bone particles is subjected to continuous axial compression of the meat-sinew-bone mass with resultant extrusion of liquid meat through the holes or foramina in the cylinder on screen surrounding the compression conveying screw or auger.

In accordance with this invention, it has been ascertained that the efficiency of operation of such a screw-type deboner or meat separating machine depends upon the relative ability of the screw or auger to generate high compression inside the screen or cylinder by minimizing circumferential slip of the meat-sinew-bone mass with respect to the stationary screen and maximizing slip with respect to the flights on the rotating screw or auger. The degree to which undesirable circumferential slip occurs is believed to reduce the efficiency of the separating process resulting in additional passes of the meat-sinew-bone mass over the screen orifices, thereby frictionally increasing the temperature of the extruded meat product and the amount of bone sheared off by the edges of the screen orifices which passes out as fine bone particles with the meat product.

According to the present invention, the screen anti-rotational gripping action on the meat-sinew-bone mass is materially increased by the design of the screen hole drilling configuration or pattern which eliminates undrilled circumferential areas or bands in the screen drilled areas and by increasing the number of holes or orifices for a given size orifice or hole. The anti-rotational gripping tendency is produced and enhanced by the extrusion of meat fibers into the screening holes or orifices. These fibers tend to plug the screen holes or orifices and are cut off by either the edge of the compression screw flights, in the case of meat separating machines wherein the augers rotate at relatively low revolutions per minute (e.g. under about 200 rpm), or by the relatively high speed motion of the bone particles or fragments in the case of high auger rpm machines (e.g. 900 rpm and above).

Previous screen or foraminous cylinder designs were based upon drilling patterns of circumferentially extending rows of holes which resulted in intervening undrilled parallel circumferetial bands extending at 90° to the longitudinal axis of a cylinder. It is now believed that these undrilled band areas resulted in a reduction of engagement of the meat fibers per unit area and a correspondingly lower anti-rotational frictional grip on the meat-sinew-bone mass.

The drilled hole pattern in accordance with the present invention provides an optimum hole configuration which eliminates the prior undrilled circumferential bands while increasing the number of gripping holes or orifices. The result is that in a typical operation, the meat product temperature rise is substantially reduced (i.e. typically by 15°-20° F.) with a concurrent increase in throughput for a given bone discharge orifice setting (e.g. 30 to 40% increases in throughput).

The object of the invention, generally stated, is the provision of new and improved foraminous cylinders or sleeve-like screens for use in rotary screw-type deboners Which in the operation of such meat separating machines result in substantial reductions in the temperature rise of the separated or extruded meat while at the same time substantially increasing the throughput capacity of the machines.

An important object of the invention is to be able to achieve such significant reductions in temperature and concurrent increases in throughput by utilizing patterns for the foramina or holes in the walls of the screens or cylinders which eliminate the prior undrilled circumferential bands and which greatly increase the number or concentration or holes or orifices.

For a more complete understanding of the nature and scope of the invention, reference may be had to the following detailed description thereof taken in connection with the wherein.

Figure 1:
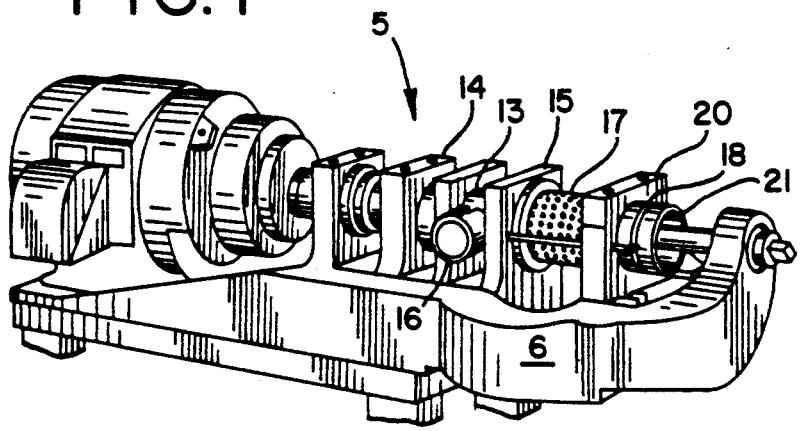
FIG. 1 is a perspective view of the operational portion of a rotary screw-type meat separating machine or deboner in which one embodiment of the present invention is incorporated.

Referring to FIG. 1, the meat separator machine indicated generally at 5 therein corresponds essentially to the machine shown in FIG. 1 of the above-mentioned U.S. Pat. Nos. RE 32,531 and 4,546,927 except for the improvements therein which are hereinafter described in connection with FIGS. 2-5. Accordingly, the detailed descriptions of the meat deboning machine 5 as contained in U.S. Pat. Nos. RE 32,531 and in 4,546,927 are incorporated herein by reference and made a part hereof. Briefly, the meat separator machine 5 includes a suitably supported rigid base or frame 6 on which is mounted an electric motor 7 capable of operating at speeds in the range of 200–1800 rpm so as to drive directly an auger having a pressure auger section (44 in RE 32,531) and a conveying auger section (53 in RE 32,531) with the feed or pressure section rotating within an imperforate pressure housing 13 and the conveying auger section rotating within a perforated housing section or foraminous cylinder 17.

The imperforate cylindrical housing 13 is rigidly supported at its rear and front ends by vertical supports 14 and 15, respectively. Ground or comminuted meat material containing a substantial content of sinew or sinew-like material and bone particles is introduced into the housing 13 through a side connection 16 as described in RE 32,531.

The foraminous cylinder 17 is removably supported at its rear infeed end by the front end of the imperforate cylindrical housing 13 and at its front end by the rear of end of an internally threaded mounting sleeve 18. The latter is supported by vertical support 20. In addition to supporting the front end of the foraminous cylinder 17, the internally threaded mounting sleeve 18 also supports therein an externally threaded sleeve-like valve member 21.

The manner in which the pressure auger section is rotatable within the compression housing 13 and coaxially joined to the rear end of the conveying auger section which is rotatable within the foraminous cylinder 17 or screen, is fully described in RE 32,531. Also described in that patent is the restricted annular discharge orifice provided in part by the valve member or sleeve 21.

Figure 6:
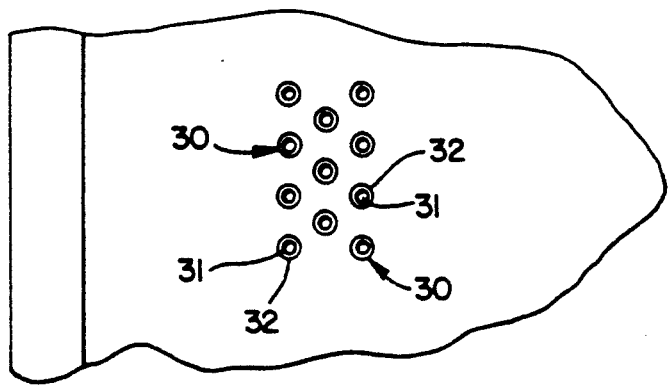
FIG. 6 is a fragmentary plan view corresponding to FIG. 4 but showing a group of foramina or holes as arranged in foraminous cylinders or screens utilized in the prior art.

Heretofore, the practice has been to provide the foraminous cylinders or screens 17 with drilled openings conforming generally to the pattern shown in FIG. 6. In FIG. 6, the foramina or holes 30 are shown arranged in parallel circumferentially extending rows aligned at 90° to the longitudinal axis of the cylinder (three being shown). In vertical cross section, each of the holes 30 will correspond generally to the hole 30 shown in FIG. 5 which has a relatively short section 31 extending to the interior of the cylinder or screen and a longer counterbore section 32 extending to the exterior thereof. By way of illustration of the prior art, when the diameters of the interior portions 31 of the holes 30 are 0.015 inch and the outer counter-drilled portions 32 are 0.031 inch in diameter, the distances between the centers of the holes 30 in adjacent rows will be approximately 0.053 inch. With these dimensions, clear bands or lands free of holes or orifices having a width of 0.038 inch will be left between adjacent rows of the holes 30.

In practice, the holes 30 with their respective inner smaller diameter sections 31 and their larger outer counterbores 32 will have different sizes depending upon different deboning or meat separating operations for which a machine 5 is being used. However, heretofore, the holes 30 have been arranged in patterns similar to the one shown in FIG. 6 with parallel circumferential bands between adjacent rows on the interior surfaces, of appreciable width which are not drilled and thus free of openings or holes.

It has been discovered in accordance with the present invention that by eliminating such parallel interior circumferential undrilled bands aligned at 90° to the longitudinal axis of a cylinder between adjacent parallel circumferential rows of holes or foramina aligned at 90° to the longitudinal axis of a cylinder, marked improvements in operation are obtained and manifested by decreases in temperature rise of the extruded meat and increases in the throughput of the machine.

Figure 2:
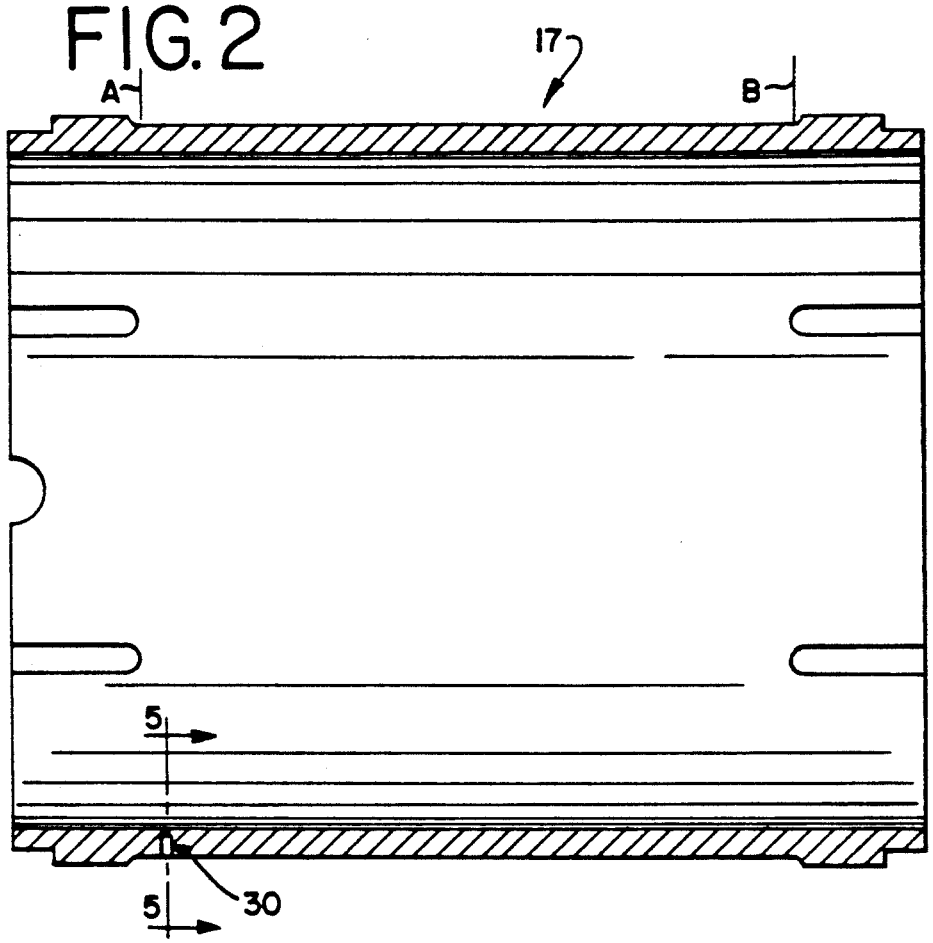
FIG. 2 is a longitudinal sectional view through a foraminous cylinder or sleeve-like screen, with one drilled hole shown, for use in the machine shown in FIG. 1 and constituting an embodiment of the present invention.
Figure 3:
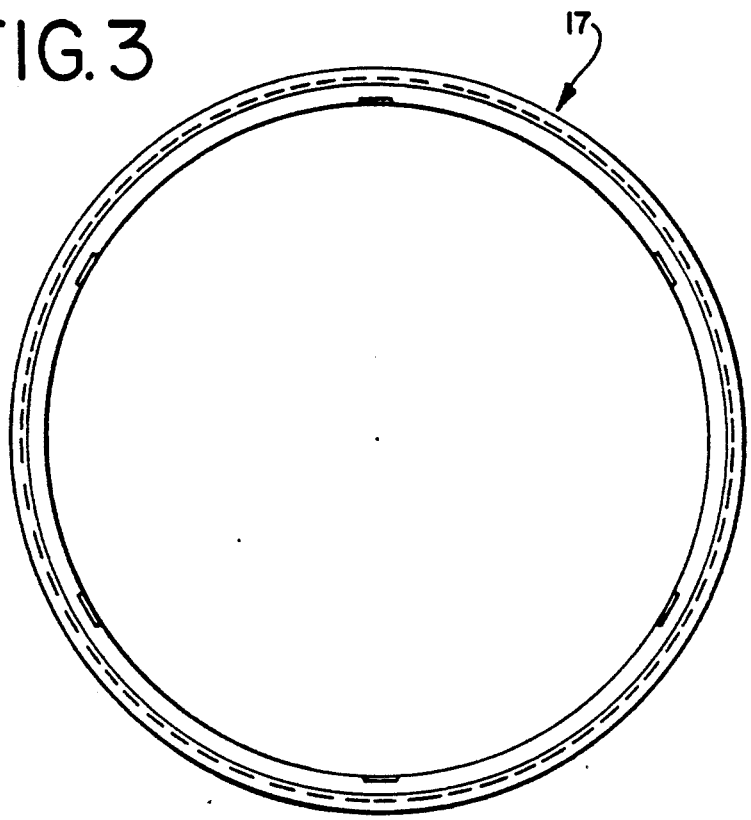
FIG. 3 is an end elevational view of the foraminous cylinder shown in FIG. 2.

Reference may now be had to FIGS. 2–5 for a description of a representative embodiment of the present invention. The cylindrical or sleeve-like blank used for the foraminous cylinder or screen 17 of FIGS. 2 and 3 corresponds to the blanks which have been used for several years to make foraminous cylinders or screens for use in deboning machines available from The Kartridg Pak Co. of Davenport, Iowa. Heat treated steel has been used for the blanks but other suitable materials may be used. The foramina or holes 30 extend through the side wall of the cylinder 17 in the area between the lines A and B (FIG. 2). The individual holes 30 may correspond to the holes 30 previously described in connection with FIGS. 5 and 6. That is, each hole 30 has a relatively short section 3 (FIG. 5) located on the interior of the cylinder wall and a relatively long counterbore section 32 extending radially outwardly. When the diameter of the inner sections 31 of the holes 30 or 35 exceed 0.026 inch, counterbore sections are usually not required.

Figure 4:
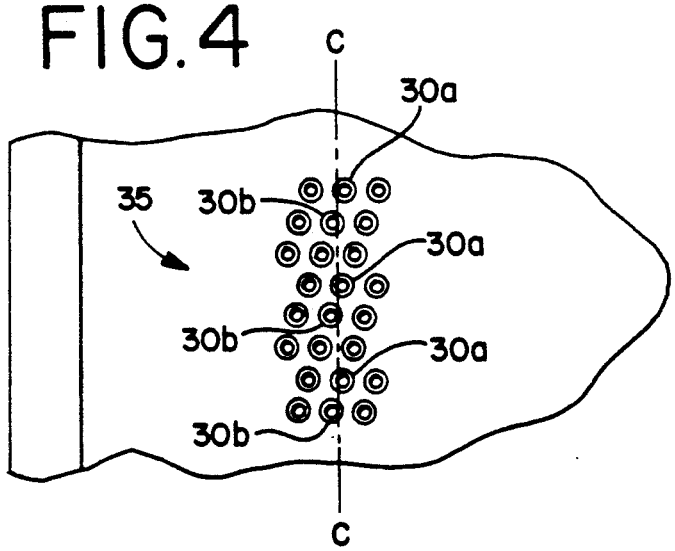
FIG. 4 is a fragmentary plan view taken from the exterior of the cylinder shown in FIGS. 2 and 3 and showing a group of the foramina or drilled holes as they appear from the exterior.
Figure 5:
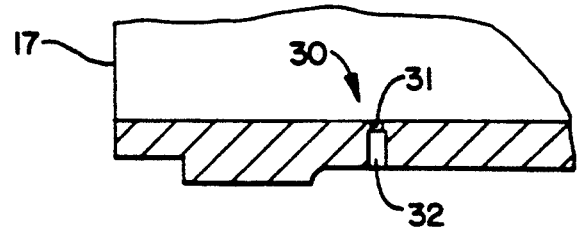
FIG. 5 is a fragmentary sectional view on enlarged scale taken on line 5—5 of FIG. 2.

Referring to FIG. 4, it will be noted that the holes 30 are arranged in circumferential rows in a pattern indicated generally at 35. For example, the holes in one row are indicated at 30a–30a while the holes in the adjacent row on one side are indicated at 30b–30b. The circumferential rows are spaced so that the small diameter inner sections 31 of the holes 30a are tangent to one side of a line C—C while the small diameter sections 31 of the holes 30b are likewise tangent to the opposite side of the line C—C. With the holes arranged in this pattern, there are no parallel undrilled circumferential bands on the interior of the cylinder wall that are aligned at 90° to the longitudinal axis of a cylinder free of foramina or holes.

While the holes 30 in each circumferential row in pattern 35 in FIG. 4 are spaced farther apart circumferentially than the holes 30 are spaced circumferentially in FIG. 6, since the circumferential rows of holes are aligned closer together axially than in FIG. 6, the hole patterns of the present invention can readily accommodate a greater number or concentration of holes in comparison with the number or concentration of holes in the hole patters of the prior art pattern.

The importance and advantages of the present invention have been demonstrated by comparative tests of three different foraminous cylinders or screens of the same overall dimensions drilled with different hole patterns and number of holes. It was first believed that throughput could be increased by substantially increasing the number of holes. Accordingly, a test screen was made having 75,456 holes arranged in spaced rows of circumferential holes as in FIG. 6. Due to the large number of holes and consequent weakening of the screen, 3 undrilled bands each 0.312 inches wide were left in the wall of the screen blank. When this test screen with 75,456 holes was tested in comparison with a commercial screen of The Kartridg Pak Co. containing 20,868 holes, surprisingly, the throughput using the test screen was only about 65 percent of the commercial screen and there was a rise in the temperature of the separated meat of approximately 14° F. over the normal increase of approximately 35° F. from infeed to discharge with The Kartridg Pak Co. screen containing 20,868 holes, proving that something more was involved than relative numbers of holes. A second test foraminous cylinder or screen was thereafter drilled from a corresponding blank with 40,320 holes arranged in a pattern conforming to FIG. 4, in accordance with this invention. The throughput obtained with this screen was 40 percent greater than that obtained with the commercial screen containing 20,868 holes and the temperature rise of the separated meat was lowered by about 20° F.

It will be understood that foraminous cylinders or screens may be made in which the holes may be all of the same size (e.g. from 0.008 to 0.125 inch in diameter) or with two or more sections of holes having different sizes. Also, instead of being made from cylindrical blanks, the foraminous screens may be made from tapered or frusto conical blanks.

What is claimed is:

1. In a machine for separating meat from feed material containing sinew-like material and bone particles, in combination, a foraminous cylinder or screen having a rear infeed end and a front discharge end, a conveying auger rotatable within said foraminous cylinder or screen, and valve means at the discharge end of said auger providing an orifice through which compacted sinew-like material and bone particles discharge, the improvement which comprises in the overall area of said cylinder or screen wherein foramina are located said area is substantially free of parallel circumferential band areas which are aligned at 90° to the longitudinal axis of the cylinder and are substantially free of foramina.

2. The improvement called for in claim 1 wherein said foramina are arranged in parallel circumferential rows aligned at 90° to the longitudinal axis of the cylinder with the foramina in each row being substantially tangent to circumferential lines on opposite sides of each row.

3. The improvement called for in claim 1 wherein said foramina are arranged in parallel circumferential rows aligned at 90° to the longitudinal axis of the cylinder with the foramina in adjacent rows being staggered on opposite sides of an intermediate line to which they are substantially tangent.

4. A foraminous cylinder for use in a machine for separating meat from feed material containing sinew-like material and bone particles and including a foraminous cylinder or screen, a conveying auger coaxially rotatable within said foraminous cylinder or screen, and valve means at the discharge end of said auger providing a restricted orifice through which compacted sinew-like material and bone particles discharge, said foraminous cylinder or screen having a rear infeed end and a front discharge end and in the overall area thereof wherein are arranged in parallel circumferential rows aligned at 90° to the longitudinal axis of the cylinder with the foramina in each row being substantially tangent to circumferential lines on opposite sides of the row.

5. A foraminous cylinder called for in claim 4 wherein the foramina in adjacent rows are staggered.

* * * * *

UNITED STATES PATENT AND TRADEMARK OFFICE
CERTIFICATE OF CORRECTION

PATENT NO. : 5,306,202
DATED : April 26, 1994
INVENTOR(S) : Rick A. Meeker

It is certified that error appears in the above-indentified patent and that said Letters Patent is hereby corrected as shown below:

Column 1, line 33, "on" should read "or".

Column 2, line 22, "Which" should read "which".

Column 2, line 37, after "the", insert --accompanying drawings--.

Column 3, line 60, after "bands", insert --aligned at 90° to the longitudinal axis of the cylinder--.

Column 4, line 18, "3" should read "31".

Column 4, line 36, after "cylinder", insert --17 and are--.

Column 6, line 23, after "wherein", insert --foramina are located substantially all said foramina--.

Signed and Sealed this

Twenty-ninth Day of November, 1994

Attest:

BRUCE LEHMAN

*Attesting Officer*  *Commissioner of Patents and Trademarks*